United States Patent
Zante et al.

(10) Patent No.: US 11,216,308 B2
(45) Date of Patent: Jan. 4, 2022

(54) COMMUNICATION ARCHITECTURE FOR EXCHANGING DATA BETWEEN PROCESSING UNITS

(71) Applicant: Zodiac Aero Electric, Montreuil (FR)

(72) Inventors: Etienne Zante, Montreuil (FR); Jean-Pierre Balbinot, Montreuil (FR); Jean-Baptiste Dubois, Montreuil (FR); Richard Manot, Montreuil (FR); Stéphane Oinard, Montreuil (FR)

(73) Assignee: SAFRAN ELECTRONICS & DEFENSE COCKPIT SOLUTIONS, Montreuil (FR)

( * ) Notice: Subject to any disclaimer, the term of this patent is extended or adjusted under 35 U.S.C. 154(b) by 64 days.

(21) Appl. No.: 15/793,817

(22) Filed: Oct. 25, 2017

(65) Prior Publication Data
US 2018/0113743 A1 Apr. 26, 2018

(30) Foreign Application Priority Data
Oct. 26, 2016 (FR) ...................................... 1660389

(51) Int. Cl.
*G06F 9/50* (2006.01)
*G06F 15/167* (2006.01)
*G06F 9/48* (2006.01)
*G06F 9/54* (2006.01)
*G06F 11/07* (2006.01)

(52) U.S. Cl.
CPC .......... *G06F 9/5016* (2013.01); *G06F 9/4887* (2013.01); *G06F 9/544* (2013.01); *G06F 11/07* (2013.01); *G06F 15/167* (2013.01)

(58) Field of Classification Search
CPC ....................................................... G06F 9/5016
See application file for complete search history.

(56) References Cited

U.S. PATENT DOCUMENTS

| 4,363,096 A | * | 12/1982 | Comfort | G06F 13/18 710/243 |
| 6,687,797 B1 | * | 2/2004 | Walton | G06F 3/0617 710/240 |
| 9,098,462 B1 | * | 8/2015 | McNicholl | G06F 13/1631 |

(Continued)

FOREIGN PATENT DOCUMENTS

FR 3019340 A1 10/2015

OTHER PUBLICATIONS

Pitter et al., "A Real-Time Java Chip-Multiprocessor", ACM, pp. 6-11 and 14 (Year: 2009).*

(Continued)

*Primary Examiner* — William B Partridge
(74) *Attorney, Agent, or Firm* — Christensen O'Connor Johnson Kindness PLLC

(57) ABSTRACT

A communication architecture, for exchanging data between processing units that are intended to operate in parallel comprises a communication system comprising a set of interfaces each intended to be linked to a processing unit, a set of sequencers that are able to define, for each processing unit, time intervals of access to a shared memory accessible by the processing units for writing and reading data, for the sequential arbitration of accesses to said memory, and a set of address managers able to allocate each processing unit ports for access to the shared memory.

8 Claims, 3 Drawing Sheets

(56) References Cited

U.S. PATENT DOCUMENTS

2008/0172525 A1* 7/2008 Nakamura ............ G06F 3/0608
   711/113
2008/0270658 A1* 10/2008 Kaneko ............... G06F 13/1663
   710/117

OTHER PUBLICATIONS

Alena, R.L. et al., "Communications for Integrated Modular Avionics," 2007 IEEE Aerospace Conference, Mar. 3-10, 2007, Piscataway, NJ, USA, pp. 1-18.

* cited by examiner

COMMUNICATION ARCHITECTURE FOR EXCHANGING DATA BETWEEN PROCESSING UNITS

BACKGROUND

The present invention pertains to data processing systems comprising several processing units that are intended to operate in parallel and, in particular, to such data processing systems intended to be embedded aboard aircraft.

A particularly beneficial but wholly non-limiting application of the invention, relates to data processing systems based on the use of one or more graphics calculation processors that are able to cooperate with one or more central processing units to execute graphics calculations and create graphical contents intended to be displayed on a screen of a man/machine interface embedded aboard an aircraft.

The invention pertains, generally, to any data processing system comprising processing units able to receive software applications or hardware applications intended to operate in parallel.

The processing systems of this type are endowed with a communication architecture which ensures data exchange between the data processing units.

Diverse types of techniques can be used for the implementation of communication between processing units.

It is firstly possible to use a time-division multiple access (TDMA) control technique to supervise the communications between the processing units. This TDMA technique relies on temporal division of the available passband by apportioning the available access times between the various processing units. The principle of TDMA thus relies on the use of time windows or "slots" during which a single of the processing units has access to a supervised element.

On expiry of the time window, access to a resource is entrusted to another processing unit.

The time windows can be fixed and organized according to a time-repeating scheme. However, in this case, the communication is not optimal. Indeed, when a processing unit to which a time window has been accorded does not have any action to perform during the time period which has been allocated to it, the communication architecture cannot be accessed by another element which potentially has an action to perform.

This is the reason why it has been proposed to allocate the time windows dynamically. It is known to use TDMA in a dynamic version, the time windows being allocated as a function of demand, and as a function of needs in terms of passband.

A drawback with the dynamic version of TDMA accesses is that predictability of the mechanism of data exchanges at the level of each processing unit is rendered impossible. It also becomes impossible to ensure that at each instant, a party communicates with the resource to which it requires access.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An aim of the invention is to propose a communication architecture for exchanging data between processing units that are able to operate in parallel in which the forecastable character of the data communication is guaranteed.

Stated otherwise, an aim of the invention is to propose a communication architecture for exchanging data between processing units that are able to operate in parallel guaranteeing that each processing unit has access to a resource which it is actually authorized to access.

The subject of the invention is therefore, according to a first aspect, a communication architecture for exchanging data between processing units, in particular intended to receive software applications or hardware applications, that are able to operate in parallel, comprising a communication system comprising a set of interfaces each intended to be linked to a processing unit, a set of sequencers that are able to define, for each processing unit, time intervals of access to a shared memory accessible by the processing units for writing and reading data, for the sequential arbitration of accesses to said memory, and a set of address managers able to allocate each processing unit ports for access to the shared memory.

This communication architecture thus makes it possible to define time intervals of access to the shared memory while allotting each processing unit memory address areas for reading and writing data.

The address managers thus guarantee that a processing unit does not have access to any of those ports of the shared memory which it is not authorized to access.

According to another characteristic of the architecture according to the invention, the latter furthermore comprises a configuration memory intended to communicate with the address managers and intended to receive access tables, for each processing unit, for accessing the access ports and the shared memory.

Provision may be made for an error detection means to be associated with at least one of said configuration memory and said shared memory.

In one embodiment, the sequencers are time-division multiple access (TDMA) sequencers.

In one embodiment, the sequencers comprise configurable means for selectively linking said sequencers to the interfaces.

Advantageously, the shared memory comprises, for each processing unit, at least two memory locations comprising at least one memory location for storing sampled messages and at least one memory location for storing data queues.

In one embodiment, all or some of the constituent elements of the architecture are integrated into one and the same integrated circuit.

The subject of the invention is also, according to another aspect, a system for processing multiple data, comprising a set of data processing units, in particular configured to receive software applications or hardware applications, that are intended to operate in parallel.

This system comprises at least one communication architecture such as defined hereinabove for exchanging data between the processing units.

In one mode of implementation, the system comprises a first set of data processing units and at least one second set of data processing units, the units of each set being linked by means of at least one communication system each connected to one or more shared memories.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
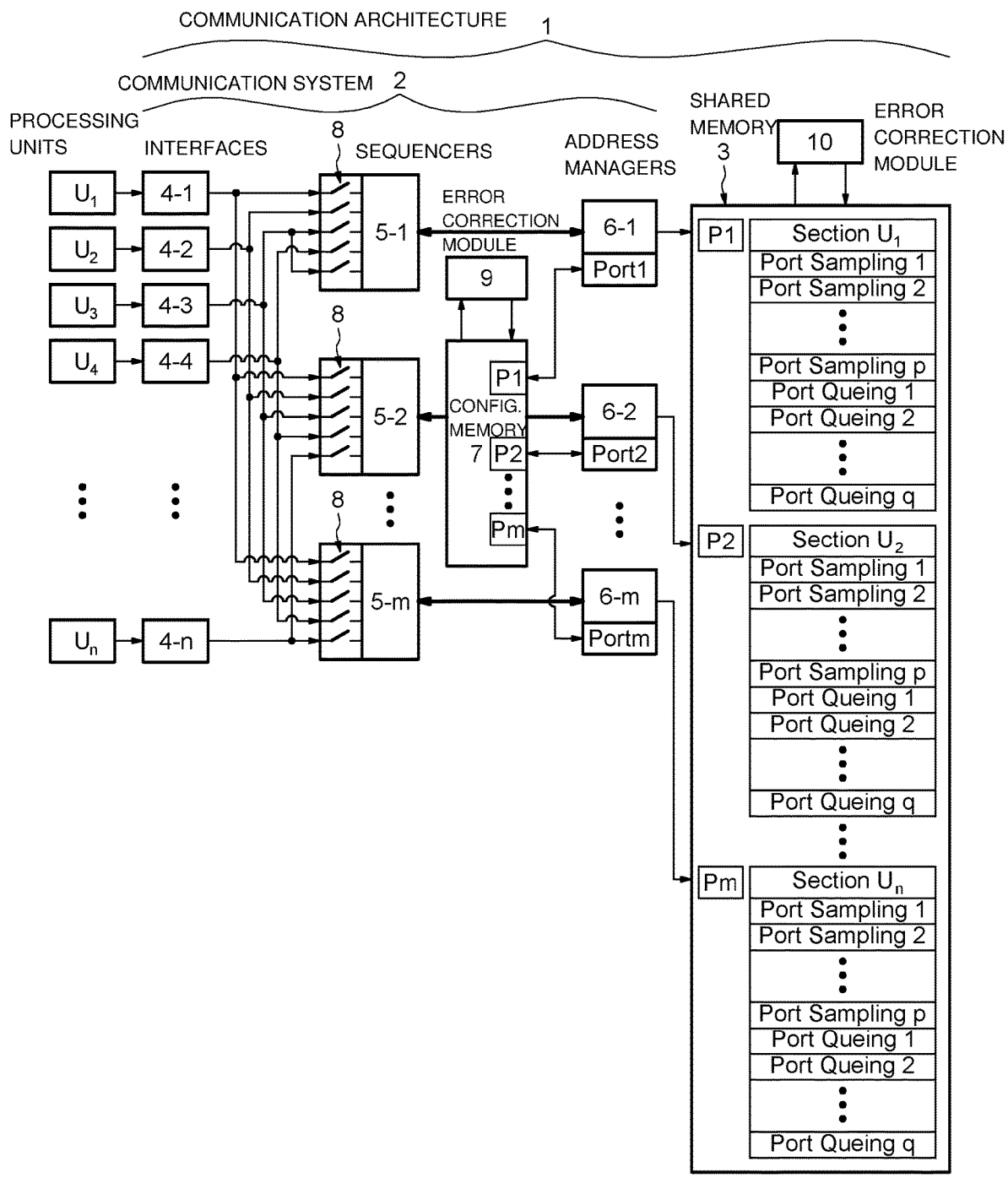
FIG. 1 is a schematic diagram of a communication architecture in accordance with the invention.

FIG. 1 schematically illustrates a communication architecture according to the invention, designated by the general numerical reference 1.

In the envisaged exemplary embodiment, this architecture 1 is intended to ensure data communication between processing units $u_2, \ldots u_n$, by way of a communication system 2 and of a shared memory 3. Said processing units $u_1$, $u_2, \ldots u_n$ are able to receive software applications or hardware applications.

The shared memory 3 may be disposed inside the communication system 2, as represented in the embodiment of FIG. 1, or else outside said system 2.

The architecture 1 of the invention may, for example, be used within a multicore data processing system comprising a set of processing units, for example processors networked to exchange data between the processors.

The networked processors may be graphics calculation processors which cooperate with central processing units.

Generally, the invention relates to a communication architecture allowing data exchange between processing units into which are loaded, or which are intended to receive, software applications or hardware applications operating in parallel.

The communication system 2 comprises, successively, a set of interfaces 4-1, 4-2, . . . 4-$n$ each linked to a single processing unit.

These interfaces consist of interfaces adapted to communicate in a bidirectional manner with the processing units.

The interfaces 4-1, . . . 4-$n$ are linked to sequencers 5-1, 5-2, . . . 5-$m$ which receive the data streams arising from the interfaces and allocate the central units time windows for access to the shared memory 3.

The sequencers 5-1, 5-2, . . . 5-$m$ may be TDMA sequencers. In this case, said sequencers 5-1, 5-2, . . . 5-$m$ ensure a temporal division of the available passband for access to the shared memory 3 by defining time windows in the course of which, for each sequencer 5-1, 5-2, . . . 5-$m$, a single of the interfaces is authorized to transfer data to the shared memory 3 or to receive data originating from this memory 3.

The system 2 is also endowed with a set of address managers 6-1, 6-2, 6-$m$ which each communicate with a corresponding sequencer and which control accesses to the memory 3.

The managers 6-1, 6-2 . . . , 6-$m$ are supervised by a configuration memory into which can be loaded one or more access tables for accessing the ports p1, p2, . . . , pm to the memory before any use or while in use.

The loading of the access table or tables makes it possible to define the configurations allowing the managers 6-1, 6-2 . . . , 6-$m$ to transfer the data during an access by a port p1, p2, . . . , pm from or to a specific physical location of the shared memory 3.

In order to guarantee access to the shared memory 3, the number m of accessible ports corresponds to the number of address managers and to the number of sequencers in such a way that the sequencers can access the memory in parallel and simultaneously.

The configuration memory 7 can be, for example, configured when starting up the processing system, during a configuration phase, in the course of which the ports to which each processing unit is intended to write are declared by the latter. These access tables are thereafter provided to the address managers to indicate the ports with which the processing units are authorized to communicate.

The essential elements of the communication system and of the sequencers can be achieved on the basis of bricks of programmable hardware means.

Thus, accesses to the ports of the memory are programmed during the prior configuration phase and the configuration is stored in the configuration memory.

It is indeed seen in FIG. 1 that the sequencers are capable of being linked to the set of interfaces 4-1, . . . 4-$n$.

According to the embodiment represented in FIG. 1, the sequencers are endowed, at input, with configurable elements for selective linking to the interfaces.

These configurable elements comprise here switches 8 which are selectively programmed so as to ensure the linking of a sequencer to a single interface.

It is also seen in FIG. 1 that the configuration memory 7 and the shared memory 3 are each endowed with an error correction module 9, 10 which ensures detection and/or correction of errors in the data stored in the memories 3 and 7. This may for example entail detecting and correcting corrupted data bits on the basis of the value of the other bits of a word that is stored in memory.

According to a variant, only one or the other of the memories is endowed with such a module for correcting errors.

Figure 2:
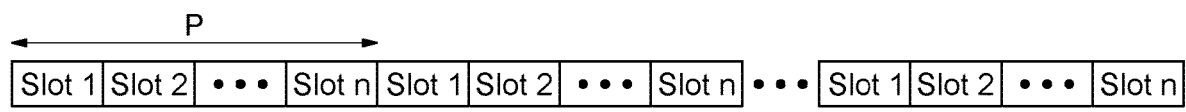
FIG. 2 illustrates the mechanism for sequencing the time-division multiple accesses implemented within the architecture of FIG. 1.

With reference to FIG. 2, the TDMA sequencers 5-1, . . . , 5-$m$ ensure arbitration of accesses to the shared memory 3 by using time intervals of access to the shared memory 3 for data writing and reading.

According to the embodiment represented in FIG. 2, the accesses are performed based on periods P of access time intervals "slot1, . . . , slotn". The sequencing used here is a sequencing based on fixed, but optionally inhomogeneous, access intervals. The size of the time intervals of each slot may be different. The configuration of these time intervals, for each period, is either loaded at startup or stored permanently in the sequencers.

Figure 3:
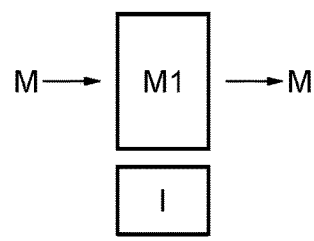
FIGS. 3 and 4 illustrate the principle of the accesses to the shared memory by storage of sampled messages and of data queues.
Figure 4:
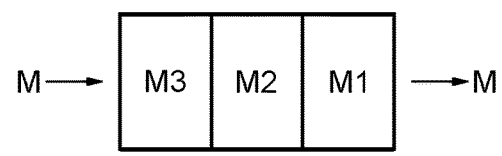

According to the embodiment represented in FIGS. 3 and 4, access to the shared memory 3 is performed, for each port, using a memory location which may be a memory location for storing sampled messages, a memory location for storing data queues or another type of location.

Thus, the memory 3 is split into sections U1, . . . , Un allocated respectively to the processing units. For each section U1, . . . , Un the shared memory 3 comprises one or more memory locations "portsampling 1", . . . "portsampling p" for reading and writing sampled messages M. This reading and writing mechanism is generally referred to as "sampling".

For each section U1, . . . , Un the shared memory also comprises memory locations for storing data queues M1, M2 and M3, "port-queueing1", . . . "port-queueingq". These accesses are referred to as "queuing".

According to the access to the memory by sampled messages, the information contained in the port is updated at each new write. Accessing the port involves managing the size of the message M.

As illustrated, an indicator I representative of the age of the data item stored in memory can be added to each memory location.

According to the memory access mechanism based on data queues, the first data item written by one of the processing units is the first data item read by the recipient processing unit receiving the data.

Once the data item has been read, it is erased from the port. This reading and writing mechanism involves the use of a notion of message size and queue depth.

In both cases, a single processing unit is authorized to write data to a port which is allocated to it. In the case of data queue based memory access, a single processing unit is authorized to read and to utilize the data written to the memory.

By virtue of the use of the address managers, the processing units can access storage elements of the memory, such as Sampling port 1 to p and Queuing port 1 to q, without knowing the physical address at which the read and written message is stored.

The address managers ensure the management of the ports.

In the case of sample based writing, the address managers ensure the integrity of the messages.

As long as a processing unit accesses a message, the latter is not altered by a new write, without however blocking this new write.

Read-access to the storage element guarantees reading of the most recent data item.

In the case of a read-access in progress, a new write does not alter the data item read by the processing unit in the course of reading. On the other hand, any new access is done on a new data item.

In the case of data queue based access, the access managers guarantee that the read message is the first one available of the queue.

During a read-access, the address managers return the data contained in the first message of the waiting queue.

At the following access, the following message is provided to the recipient, without the latter having to worry about the physical addressing of the messages.

In all cases, the address managers ensure that each of the storage elements possesses only a single provider and, in the case of queue based access, each of the storage elements possesses only a single consumer.

As regards the shared memory 3, the latter can in reality consist of one or more memories. It can also be integrated into the communication system or consist of a memory external to the latter.

The communication system, or the main constituent elements of said system, can be integrated into one and the same integrated circuit.

The invention which has just been described can be used to ensure data exchange between processing units of a multiple data processing system.

It may for example entail ensuring communication between data processors that are partitioned and networked.

Figure 5:
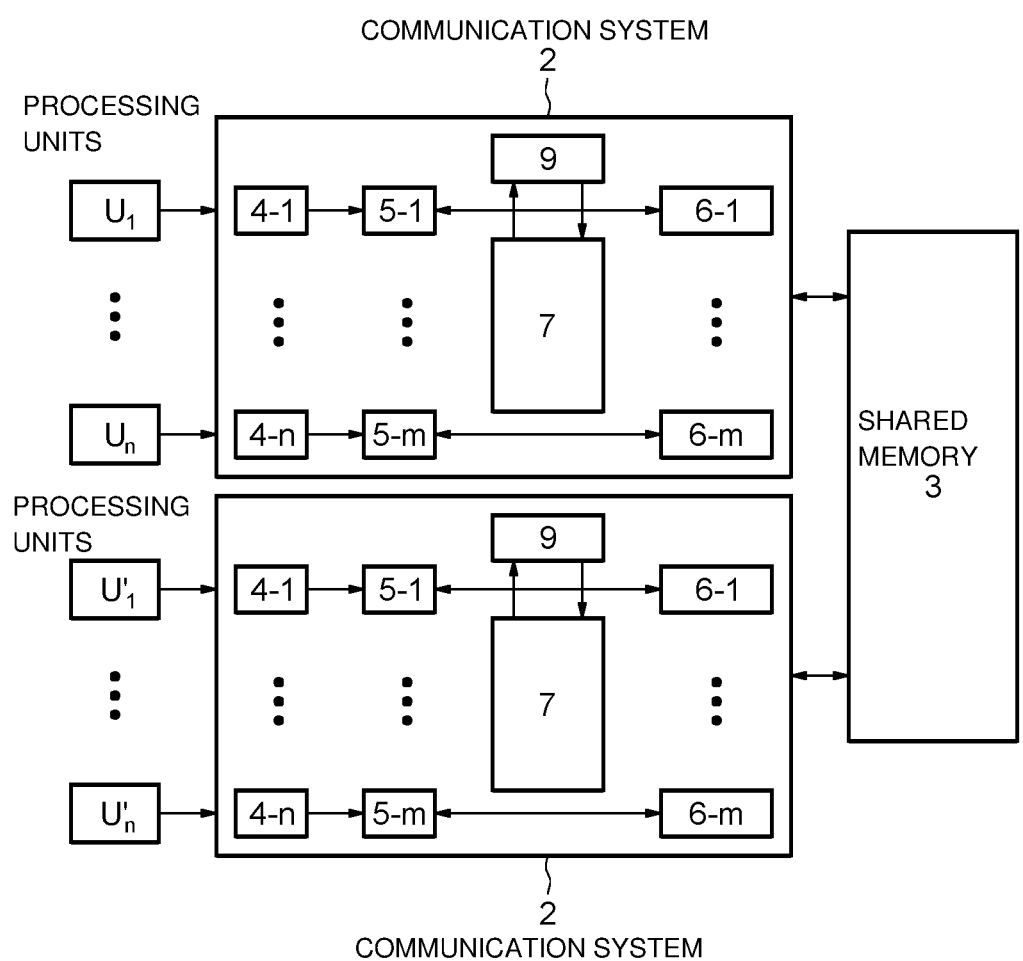
FIG. 5 illustrates an exemplary implementation of a multiple data processing system using a communication architecture of FIG. 1.

An exemplary embodiment of such a system has been represented in FIG. 5.

The system illustrated in FIG. 5 is a multicore system which here comprises two stages each comprising several processing units u1, . . . , un, and one or more additional sets of processing units u'1, . . . u'n. The system according to the invention can be a multicore system comprising three stages, four stages, or indeed more.

The exchanges of data between the processing units of the first set and of the second set of processing units and within each processing unit are performed by means of a communication system identical to the communication system 2 described previously, by way of one or more shared memories 3.

According to the embodiment represented in FIG. 5, the communication systems 2 share the same shared memory 3.

According to another variant, the communication systems 2 can each have one or more dedicated shared memories 3.

While illustrative embodiments have been illustrated and described, it will be appreciated that various changes can be made therein without departing from the spirit and scope of the invention.

The embodiments of the invention in which an exclusive property or privilege is claimed are defined as follows:

1. A communication architecture for exchanging data between processing units that are able to operate in parallel, wherein the communication architecture comprises a communication system comprising:
   a plurality of interfaces each individually linking a corresponding processing unit to an individual sequencer of a plurality of sequencers,
   the plurality of sequencers configured to define, for each processing unit, time intervals of access to a shared memory accessible by the processing units for writing and reading data, for the sequential arbitration of accesses to said memory, wherein the sequencers of the plurality of the sequencers are time-division multiple access (TDMA) sequencers, wherein the sizes of the time intervals of each slot are either the same or different, wherein the time intervals, for each period, are either loaded at startup or stored permanently in the sequencers, wherein the shared memory is accessible by a single interface within a particular time interval, and wherein each individual sequencer is couplable to one of the plurality of interfaces through programmable switches and without any intervening sequencers, and
   a plurality of address managers configured to allocate each processing unit ports for access to the shared memory.

2. The architecture as claimed in claim 1, furthermore comprising a configuration memory intended to communicate with the address managers and intended to receive access tables, for each processing unit, for accessing the access ports and the shared memory.

3. The architecture as claimed in claim 2, comprising an error detection means associated with at least one of said configuration memory and said shared memory.

4. The architecture as claimed in claim 1, in which the sequencers of the plurality of the sequencers comprise configurable means of selective linking of said sequencers to the interfaces.

5. The architecture as claimed in claim 1, in which the shared memory comprises, for each processing unit, at least two memory locations comprising at least one memory location for storing sampled messages and/or at least one memory location for storing data queues.

6. The architecture as claimed in claim 1, in which all or some of the constituent elements of the architecture are integrated into one and the same integrated circuit.

7. A system for processing multiple data, comprising a plurality of data processing units that are intended to operate in parallel, wherein said system comprises at least one communication architecture as claimed in claim 1, for exchanging data between the processing units.

8. The processing system as claimed in claim 7, comprising a first plurality of processing units and at least one second plurality of processing units, the units of each plurality of processing units being linked by means of at least one communication system each connected to one or more shared memories.

\* \* \* \* \*